United States Patent
Beer et al.

(10) Patent No.: US 6,641,925 B1
(45) Date of Patent: Nov. 4, 2003

(54) THERMOFORMABLE COMPOSITE FILM AND PROCESS TO MAKE

(75) Inventors: Ekkehard Beer, Bad Schwalbach (DE); Wilfried Hatke, Hofheim (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/340,949

(22) Filed: Jun. 28, 1999

(30) Foreign Application Priority Data

Jun. 29, 1998 (DE) .......... 198 28 866
Jun. 29, 1998 (DE) .......... 198 28 858
Jun. 29, 1998 (DE) .......... 198 28 857
Jun. 29, 1998 (DE) .......... 198 28 867

(51) Int. Cl.$^7$ .......... B32B 27/08; B32B 1/08; B29D 22/00; B29D 23/00; B65D 73/00

(52) U.S. Cl. .......... 428/518; 428/517; 428/36.7; 428/36.6; 428/35.7; 206/469

(58) Field of Search .......... 428/518, 517, 428/35.7, 35.2, 36.6, 36.7, 35.9; 206/469, 470

(56) References Cited

FOREIGN PATENT DOCUMENTS

| EP | 0 498 384 | 8/1992 | |
|---|---|---|---|
| EP | 0 498 384 A3 * | 8/1992 | .......... B29C/67/24 |
| EP | 0 570 188 | 11/1993 | |
| EP | 0 570 188 A2 * | 11/1993 | .......... B32B/27/32 |
| EP | 0 649 737 | 4/1995 | |
| EP | 0 773 102 | 5/1997 | |
| EP | 0 800 914 | 10/1997 | |
| EP | 0 800 914 A1 * | 10/1997 | .......... B32B/27/08 |
| EP | 0 920 989 | 6/1999 | |

* cited by examiner

Primary Examiner—Harold Pyon
Assistant Examiner—Michael C Miggins
(74) Attorney, Agent, or Firm—Connolly Bove Lodge & Hutz LLP (57) ABSTRACT

The present invention relates to a thermoformable composite film, a process for producing a thermoformable composite film, the use of a solvent-free adhesive for applying a thermoplastic film to a film comprising cycloolefin copolymer in order to produce a thermoformable composite film, an extrusion coated film and a process for producing an extrusion coated film and use of the film as a packaging material.

10 Claims, 9 Drawing Sheets

THERMOFORMABLE COMPOSITE FILM AND PROCESS TO MAKE

CROSS-REFERENCE TO RELATED APPLICATIONS

This application is related to German application numbers 198 28 867.0 198 28 866.2 198 28 858.1 and 198 28 857.3 all of which were filed Jun. 29, 1998 and which are incorporated by reference in its entireties for all useful purposes.

BACKGROUND OF THE INVENTION

The present invention relates to a thermoformable composite film, a process for producing a thermoformable composite film, the use of a solvent-free adhesive for applying a thermoplastic film to a film comprising cycloolefin copolymer in order to produce a thermoformable composite film, an extrusion coated film and a process for producing an extrusion coated film and use of the film as a packaging material.

To produce high-performance packaging, flexible films are molded to the shape of a tray or capsule using the action of heat and pressure and a mechanical ram at super- and/or subatmospheric pressure. The film serves firstly to protect the contents. It has to protect the contents from the effect of the environment. The film must therefore have a high water-vapor, gas and UV barrier. It must have mechanical stability to protect the contents from physical effects and so that it does not itself become damaged by the contents. The quality of the contents must not be impaired by individual constituents being released from within the film.

Blister packs are increasingly frequently chosen as packaging for a wide variety of articles, since this type of pack is available in a wide variety of forms and meets the requirements of mechanized packaging processes. The starting materials used for blister packs are thermoformable films. These are plastic films which when heated can be shaped relatively readily by applying super- or subatmospheric pressure pneumatically, or using a ram. Appropriate selection of the molds can thus introduce depressions (blisters) into the film (base film) and these can be matched to the shape of the article to be packed. After this shaping step the article to be packed is introduced into the resulting blister. Once the blister has been filled, a backing film is applied to the base film and encloses the article to be packed within its blister.

If all of the requirements cannot be covered by a single material, the properties required in a film are achieved by combining more than one film to give a composite film. Films produced from cycloolefin copolymers have very good impermeability to water vapor. However, these films have poor resistance to fats. Environmental-stress-cracking corrosion occurs on exposure to unsaturated fatty acids.

The film most frequently used in blister packs is polyvinyl chloride (PVC). To increase its barrier properties with respect to gases, in particular water vapor, the amorphous PVC base film is frequently coated with PVDC. Films made from unoriented polypropylene (uPP) give better water-vapor barrier properties than PVC films and are less questionable from an environmental point of view. However, the disadvantage is the poorer thermoformability and higher shrinkage of this partially crystalline material.

The amorphous COC mono- or multilayer films described in EP-A-570 188 and EP-A-631 864, when used as base films, give good processing and good barrier properties.

Relatively new developments in the area of blister packs for pharmaceuticals describe the use of amorphous polyolefins with good processing performance and high water-vapor barriers. For example, EP-A-570 188 and EP-A-631 864 describe the use of polyolefins with cyclic olefins as polymeric building block. These applications describe the use of these polyolefins (cycloolefin copolymers, abbreviated to COC) in the form of mono- or multilayer films for blister packs.

Alongside automated packing and the presentation of the product protected within the blister, for example pharmaceuticals in the form of tablets, capsules or the like, the blister pack can markedly reduce exposure to atmospheric moisture and oxygen and thus increase shelf life.

SUMMARY OF THE INVENTION

An object of the present invention is to provide a composite film having a high level of barrier properties and a cost-effective and environmentally friendly process for producing a thermoformable composite film with a high level of barrier properties, very good thermoforming performance and good resistance to fats.

Another object of the present invention is achieved by means of an extrusion-coated film comprising at least one film which comprises cycloolefin copolymer and comprising, on at least one side of this film, a layer of extrusion-coated thermoplastic material.

Extrusion-coating technology comprises the production of films having more than one layer by using extrusion from the melt to apply a thermoplastic to a previously produced film web.

The film web used for the extrusion-coating may be a monofilm, composed of one single layer, or else may itself be a composite film.

The thermoplastics used are mostly readily extrudable products, especially polyethylenes, ionomers or ethylene-vinyl acetate copolymers. Preference is given to the use of polyethylene and particularly LDPE. These materials have good bond strength which prevents subsequent delamination.

Another object of the present invention is achieved by means of a process for producing a thermoformable composite film, where a solvent-free adhesive is used to apply at least one thermoplastic film laminated to a film comprising cycloolefin copolymer.

The object is achieved by means of a process for producing a thermoformable composite film, where a solvent-free single-component adhesive is used to apply the thermoplastic film laminated to the film comprising cycloolefin copolymer.

One novel feature of the process is the use of a solvent-free single-component adhesive for applying a thermoplastic film to a film comprising cycloolefin copolymer in order to produce a thermoformable composite film.

The composite film produced according to the invention is particularly suitable for producing blister packs.

At relative humidity of about 85% and at a temperature of about 23° C., the film has water-vapor permeability of $\leq 0.05$ g/m$^2$d, a puncture resistance of $\leq 20$ N and a thickness of $\leq 100$ μm.

DETAILED DESCRIPTION OF THE INVENTION

The films suitable for the purposes of the invention comprise at least one cycloolefin polymer selected from the class consisting of polymers containing from 0.1 to 100% by weight, preferably from 10 to 90% by weight, based on the total weight of the cycloolefin copolymer, of polymerized units of at least one cyclic olefin of the formulae I, II, II', III, IV, V or VI where $R^1$, $R^2$, $R^3$, $R^4$, $R^5$, $R^6$, $R^7$ and $R^8$ are identical or different and are a hydrogen atom or a $C_1$–$C_{20}$-hydrocarbon radical, such as a linear or branched $C_1$–$C_8$-alkyl radical or $C_6$–$C_{18}$-aryl radical or $C_7$–$C_{20}$-alkylenearyl radical, or a cyclic or acyclic $C_2$–$C_{20}$-alkenyl radical, or form a saturated, unsaturated or aromatic ring, where the same radicals $R^1$ to $R^8$ in the different formulae I to VI may have different meanings, and n may be from 0 to 5, and from 0 to 99.9 mol %, based on the total composition of the cycloolefin copolymer, of polymerized units which derive from one or more acyclic olefins of the formula VII (VII), where $R^9$, $R^{10}$, $R^{11}$ and $R^{12}$ are identical or different and are a hydrogen atom, a linear or branched, saturated or unsaturated $C_1$–$C_{20}$-hydrocarbon radical, such as a $C_1$–$C_8$-alkyl radical, or a $C_6$–$C_{18}$-aryl radical.

The cycloolefin copolymers may also be obtained by ring-opening polymerization of at least one of the monomers with the formulae I to VI, followed by hydrogenation of the products obtained.

The novel elastomeric cycloolefin copolymer may also contain from 0 to 45 mol %, based on the total composition of the cycloolefin copolymer, of polymerized units which derive from one or more monocyclic olefins of the formula VIII (VIII), where m is a number from 2 to 10.

The proportion of the polymerized units which derive from cyclic, in particular polycyclic, olefins, is preferably from 3 to 75 mol %, based on the total composition of the cycloolefin copolymer. The proportion of the polymerized units which derive from acyclic olefins is preferably from 5 to 80 mol %, based on the total composition of the cycloolefin copolymer.

The cycloolefin copolymers are preferably composed of polymerized units which derive from one or more polycyclic olefins, in particular from polycyclic olefins of the formulae I or III, and polymerized units which derive from one or more acyclic olefins of the formula VII, in particular a-olefins having from 2 to 20 carbon atoms. Particular preference is given to cycloolefin copolymers which are composed of polymerized units which derive from a polycyclic olefin of the formula I or III and from an acyclic olefin of the formula VII. Preference is also given to terpolymers which are composed of polymerized units which derive from a polycyclic monoolefin of the formula I or III, from an acyclic monoolefin of the formula VII and from a cyclic or acyclic olefin which contains at least two double bonds (polyene), in particular cyclic, preferably polycyclic, dienes, such as norbornadiene, or cyclic, particularly preferably polycyclic, alkenes with a $C_2$–$C_{20}$-alkenyl radical, such as vinyinorbornene.

The novel elastomeric cycloolefin copolymers preferably comprise olefins with a basic norbornene structure, particularly preferably norbornene, tetracyclododecene and, if desired, vinyinorbornene or norbornadiene. Preference is also given to cycloolefin copolymers which contain polymerized units which derive from acyclic olefins with terminal double bonds, such as a-olefins having from 2 to 20 carbon atoms, particularly preferably ethylene or propylene. Particular preference is given to norbornene-ethylene and tetracyclododecene-ethylene copolymers.

Among the terpolymers, particular preference is given to norbornene-vinylnorbornene-ethylene, norbornene-norbornadiene-ethylene, tetracyclododecene-vinylnorbornene-ethylene and tetracyclododecene-vinyltetracyclododecene-ethylene terpolymers. The proportion of the polymerized units which derive from a polyene, preferably vinylnorbornene or norbornadiene, is from 0.1 to 50 mol %, preferably from 0.1 to 20 mol %, and the proportion of the acyclic monoolefin of the formula VII is from 0 to 99.9 mol %, preferably from 5 to 80 mol %, based on the total composition of the cycloolefin copolymer. In the terpolymers described, the proportion of the polycyclic monoolefin is from 0.1 to 99.9 mol %, preferably from 3 to 75 mol %, based on the total composition of the cycloolefin copolymer.

The cycloolefin copolymer according to the invention preferably comprises at least one cycloolefin copolymer containing polymerized units which derive from polycyclic olefins of the formula I and containing polymerized units which derive from acyclic olefins of the formula VII.

The cycloolefin copolymers according to the invention may be prepared at temperatures of from −78 to 200° C. and at a pressure of from 0.01 to 200 bar, in the presence of one or more catalyst systems which comprise at least one transition metal compound and, if desired, a cocatalyst and, if desired, a support. Suitable transition metal compounds are metallocenes, in particular stereorigid metallocenes. Examples of catalyst systems suitable for preparing the elastomeric cycloolefin copolymers according to the invention are described in EP-A407 870, EP-A-485 893 and EP-A-503 422. These publications are expressly incorporated herein by way of reference.

Examples of transition metal compounds used are:
rac-dimethylsilylbis(1-indenyl)zirconium dichloride,
rac-dimethylgermylbis(1-indenyl)zirconium dichloride,
rac-phenylmethylsilylbis(1-indenyl)zirconium dichloride,
rac-phenylvinylsilylbis(1-indenyl)zirconium dichloride,
1-silacyclobutylbis(1-indenyl)zirconium dichloride,
rac-diphenylsilylbis(1-indenyl)hafnium dichloride,
rac-phenylmethylsilylbis(1-indenyl)hafnium dichloride,
rac-diphenylsilylbis(1-indenyl)zirconium dichloride,
rac-ethylene-1,2-bis(1-indenyl)zirconium dichloride,
dimethylsilyl(9-fluorenyl)(cyclopentadienyl)zirconium dichloride,
diphenylsilyl(9-fluorenyl)(cyclopentadienyl)zirconium dichloride,
bis(1-indenyl)zirconium dichloride,
diphenylmethylene(9-fluorenyl)cyclopentadienylzirconium dichloride,
isopropylene(9-fluorenyl)cyclopentadienylzirconium dichloride,
rac-isopropylidenebis(1-indenyl)zirconium dichloride,
phenylmethylmethylene(9-fluorenyl)cyclopentadienylzirconium dichloride,
isopropylene(9-fluorenyl)(1-(3-isopropyl)cyclopentadienyl)zirconium dichloride,
isopropylene(9-fluorenyl)(1-(3-methyl)cyclopentadienyl)zirconium dichloride,
diphenylmethylene(9-fluorenyl)(1-(3-methyl)cyclopentadienyl)zirconium dichloride,
methylphenylmethylene(9-fluorenyl)(1-(3-methyl)cyclopentadienyl)-zirconium dichloride,
dimethylsilyl(9-fluorenyl)(1-(3-methyl)cyclopentadienyl)zirconium dichloride,
diphenylsilyl(9-fluorenyl)(1-(3-methyl)cyclopentadienyl)zirconium dichloride,
diphenylmethylene(9-fluorenyl)(1-(3-tert-butyl)cyclopentadienyl)zirconium dichloride,
isopropylene(9-fluorenyl)(1-(3-tert-butyl)cyclopentadienyl)zirconium dichloride,
isopropylene(cyclopentadienyl)(1-indenyl)zirconium dichloride,
diphenylcarbonyl(cyclopentadienyl)(1-indenyl)zirconium dichloride,
dimethylsilyl(cyclopentadienyl)(1-indenyl)zirconium dichloride,
isopropylene(methylcyclopentadienyl)(1-indenyl)zirconium dichloride,
4-($h^5$-cyclopentadienyl)-4,7,7-trimethyl($h^5$-4,5,6,7-tetrahydroindenyl)-zirconium dichloride,
[4-($h^5$-cyclopentadienyl)-4,7,7-triphenyl($h^5$-4,5,6,7-tetrahydroindenyl)]zirconium dichloride,
[4-($h^5$-cyclopentadienyl)-4,7-dimethyl-7-phenyl($h^5$-4,5,6,7-tetrahydroindenyl)]zirconium dichloride,
[4-($h^5$-3'-tert-butylcyclopentadienyl)-4,7,7-triphenyl($h^5$-4,5,6,7-tetrahydroindenyl)]zirconium dichloride,
[4-($h^5$-3'-tert-butylcyclopentadienyl)-4,7-dimethyl-7-phenyl($h^5$-4,5,6,7-tetrahydroindenyl)]zirconium dichloride,
[4-($h^5$-3'-methylcyclopentadienyl)-4,7,7-trimethyl($h^5$-4,5,6,7-tetrahydroindenyl)]zirconium dichloride,
[4-($h^5$-3'-methylcyclopentadienyl)-4,7,7-triphenyl($h^5$-4,5,6,7-tetrahydroindenyl)]zirconium dichloride,
[4-($h^5$-3'-methylcyclopentadienyl)-4,7-dimethyl-7-phenyl($h^5$-4,5,6,7-tetrahydroindenyl)]zirconium dichloride,
[4-($h^5$-3'-isopropylcyclopentadienyl)-4,7,7-trimethyl($h^5$-4,5,6,7-tetrahydroindenyl)]zirconium dichloride,
[4-($h^5$-3'-isopropylcyclopentadienyl)-4,7,7-triphenyl($h^5$-4,5,6,7-tetrahydroindenyl)]zirconium dichloride,
[4-($h^5$-3'-isopropylcyclopentadienyl)-4,7-dimethyl-7-phenyl($h^5$-4,5,6,7-tetrahydroindenyl)]zirconium dichloride,
[4-($h^5$-cyclopentadienyl)($h^5$-4,5-tetrahydropentalene)]zirconium dichloride,
[4-($h^5$-cyclopentadienyl)-4-methyl($h^5$-4,5-tetrahydropentalene)]zirconium dichloride,
[4-($h^5$-cyclopentadienyl)-4-phenyl($h^5$-4,5-tetrahydropentalene)]zirconium dichloride,
[4-($h^5$-cyclopentadienyl)-4-phenyl($h^5$-4,5-tetrahydropentalene)]zirconium dichloride,
[4-($h^5$-cyclopentadienyl)-4-phenyl($h^5$-4,5-tetrahydropentalene)]zirconium dichloride,
[4-($h^5$-3'-isopropylcyclopentadienyl)($h^5$-4,5-tetrahydropentalene)]zirconium dichloride,
[4-($h^5$-3'-benzylcyclopentadienyl)($h^5$-4,5-tetrahydropentalene)]zirconium dichloride,
[2,2,4-trimethyl-4-($h^5$-cyclopentadienyl)($h^5$-4,5-tetrahydropentalene)]zirconium dichloride,
[2,2,4-trimethyl-4-($h^5$-(3,4-diisopropyl)cyclopentadienyl)($h^5$-4,5-tetrahydropentalene)]zirconium dichloride.

The COC films used according to the invention are distinguished by specific mechanical properties. The films can be processed on the machinery used and also have low puncture resistance and a high level of barrier properties, especially to water vapor. Suitable COC films of this type are oriented. They may be monolayer films or have more than one layer. The films may comprise organic or inorganic fillers in order to reduce light transmission so as to render the contents invisible (childproof packaging) or in order to improve printability or sealing properties.

The cycloolefin copolymers are prepared by heterogeneous or homogeneous catalysis with organometallic compounds as described in many patents. Catalyst systems based on mixed catalysts made from titanium salts and organoaluminum compounds are described in DD-A-109 224 and DD-A-237 070. EP-A-156 464 describes the preparation using catalysts based on vanadium. EP-A-283 164, EP-A-407 870, EP-A485 893 and EP-A-503 422 describe the preparation of cycloolefin polymers using catalysts based on soluble metallocene complexes. The preparation processes described and the catalyst systems used in these patents for preparing COCs are incorporated herein by way of reference.

Unoriented extruded COC films are brittle, making it difficult to find appropriate processing conditions, and their processing performance is poor, cf. DE-A4304309. They readily split or break during winding-up and/or unwinding under tension. For this reason their mechanical strength has to be increased. This may be achieved by orientation (mono- or biaxial stretching) of the films. The films oriented in this way are significantly easier to handle and do not have the disadvantages as described in DE-A-4304309. The puncture resistance of oriented films was studied in accordance with DIN 53373. One measure of puncture resistance is penetration energy. It has now been established that orientation increases the puncture resistance of the films.

Exceptionally, the values found were larger than those of unoriented films of comparable thickness. DE-A-4414669 states that 450 N/mm is excessively high for a film to be useful as a backing film for blister packs. Significantly lower values are desirable on blister-packing machinery for fragile pharmaceuticals. The puncture resistances of aluminum foils can be taken as a preliminary guide: that of a (16 $\mu$m) aluminum film is 90 N/mm. When oriented COC films are used, therefore, it is not possible to ensure easy removal of the pharmaceutical from the blister packs.

Alongside ideal, but not excessively low, puncture resistance, the blister film must have relatively high toughness. Careful balancing of mechanical strength (hardness), flexibility and the force required to compress the compartment is required to enable the contents, such as a tablet, capsule pastille or dragee are to be capable of release from the pack without damage and without unreasonable expenditure of effort. Low expenditure of effort is a particular requirement when elderly people use the product, and also in the clinical sector where medical personnel are continually using pressure to remove tablets and can suffer from fatigue or aching in the fingers.

The water-vapor barrier effectiveness of the films is comparable with that of unoriented COC films, i.e. the orientation has no marked effect on the barrier effectiveness of the films. The thickness of the backing films based on COC films should therefore be within the range of the thickness of the films in the blister after forming. The resultant thicknesses for the backing films are from 20 to 150 $\mu$m, preferably from 40 to 100 $\mu$m. The thicknesses of the extrusion-coated layered material with COC films as a base should therefore be within the range of the thicknesses of the films in the blister after it has been formed. The resultant thicknesses for the layers of material applied by extrusion are from 1 to 150 $\mu$m, preferably from 5 to 30 $\mu$m.

The layer of polymer extrusion-coated here onto at least one side protects the COC base film from fats, thus increasing the stability and the value of the composite film.

The water-vapor barrier effectiveness is not significantly affected by organic or inorganic additives. It is from 0.2 to 0.4 g/m$^2$·d for a film thickness of 100 $\mu$m. The polarity of the surface can be increased by corona-treating the film.

The additives may be organic polymers, such as polypropylene or polyethylene in the form of homo- or copolymers, polyesters, polyamides, polycarbonate, polyacetals, and acrylate and methacrylate polymers. Inorganic pigments which may be used are titanium dioxide, barium sulfate, calcium sulfate, calcium carbonate and barium carbonate.

One or both sides of the COC film may be laminated with a film which comprises polymers such as unoriented or oriented polyethylene, polypropylene or polyvinyl chloride. The thickness of the film laminated to the COC film is from 1 to 150 $\mu$m, preferably 5 to 150 $\mu$m or 1 to 100 $\mu$m and preferably from 10 to 100 $\mu$m or 5 to 50 $\mu$m and particularly preferably from 20 to 50 $\mu$m. A solvent-free adhesive is preferably used in the lamination, particularly preferably a solvent-free single-component adhesive.

It is preferable to laminate COC with unoriented polypropylene (uPP) or else PVC on one or both sides. Compared with COC, the films produced with unoriented polypropylene and PVC are significantly thinner. COC and uPP, and COC and PVC, give as a laminate a flexible, puncture-resistant composite film of good appearance. A further advantage of a laminate made from PVC and COC for the user, possibly a pharmaceutical blister pack manufacturer, is that it can replace packaging previously composed exclusively of PVC. The novel laminate made from PVC and COC is of high quality and has relatively high impermeability to water vapor, retaining surface contact with the contents via the PVC layer. The approval procedure is thus simplified. It is also preferable to laminate with oriented polypropylene (oPP) on one or both sides. Oriented polypropylene can be used to produce films substantially thinner those using COC. COC and oPP in the form of a laminate give a flexible, puncture-resistant composite film of good appearance.

The thickness of the entire film is from 50 to 550 $\mu$m, preferably from 150 to 400 $\mu$m and 200 to 350 $\mu$m. However, if a PVC layer is used the thickness of the entire film is preferable 160 to 450 $\mu$m and particularly preferable 20 to 300 $\mu$m. The thickness of the film laminated to the COC film is from 1 to 150 $\mu$m, preferably from 1 to 100 $\mu$m and particularly preferably from 4 to 50 $\mu$m. The thickness of the COC film is from 50 to 400 $\mu$m, preferably from 150 to 350 $\mu$m, particularly preferably from 200 to 300 $\mu$m. The thickness of the PVC film is from 5 to 150 $\mu$m, preferably from 10 to 100 $\mu$m and particularly preferably from 20 to 50 $\mu$m. The thickness of the COC film is from 50 to 400 $\mu$m, preferably from 150 to 350 $\mu$m, particularly preferably from 200 to 300 $\mu$m.

The novel process for producing a thermoformable composite film uses a solvent-free adhesive, preferably a solvent-free, single-component adhesive.

Particularly suitable for this purpose according to the invention is a solvent-free polyurethane-based moisture-curing single-component laminating resin. The laminating resin used differs from conventional laminating adhesives by being supplied and used with 100% solids content. The laminating resin is suitable for producing laminates from aluminum and paper, card or parchment, and for producing laminates from plastic films and paper or aluminum films. According to the invention the novel adhesive is very particularly suitable for producing thermoformable composite films where the novel adhesive is used to apply at least one thermoplastic film laminated to a film comprising cycloolefin copolymer.

Processing takes place on LF laminating plants which have heatable application systems and laminating units. Since the laminating resin is applied without solvent, no drying tunnels are required. A heatable laminating unit is advantageous for varying combinations. The laminating resin has to be heated to 80–100° C. for application.

The novel thermoformable composite film is used for producing blister packs. The blister pack or PTP (push-through packaging) produced therefrom has very good water-vapor barrier properties, thus increasing the value of the packaged item. It can be used to pack contents such as pharmaceuticals and foodstuffs, in particular pelletized or capsule pharmaceuticals, foods containing rice, cookies, snacks, and also hygroscopic items, such as cigarettes and teabags.

The layer of polymer extrusion-coated here onto at least one side protects the COC base film from fats, thus increasing the stability and the value of the composite film.

The invention is described in more detail using a drawing and examples.

Figure 1:
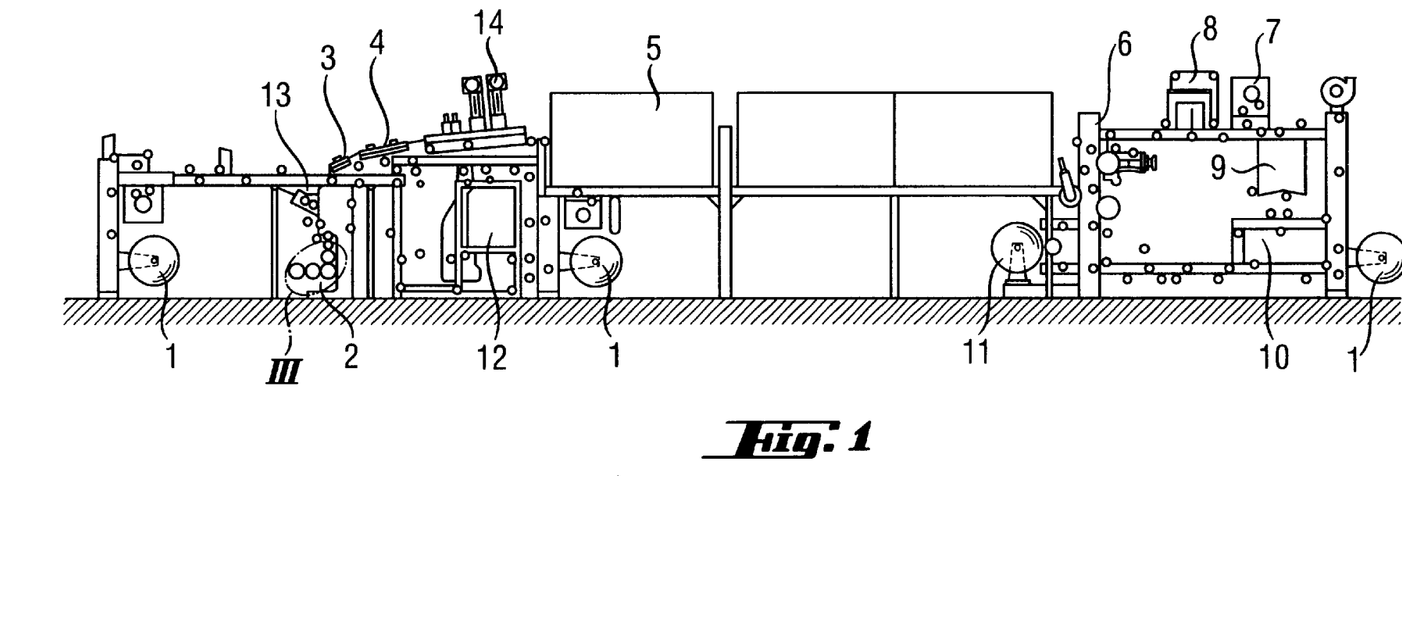
FIG. 1 shows a coating plant.
Figure 2A:
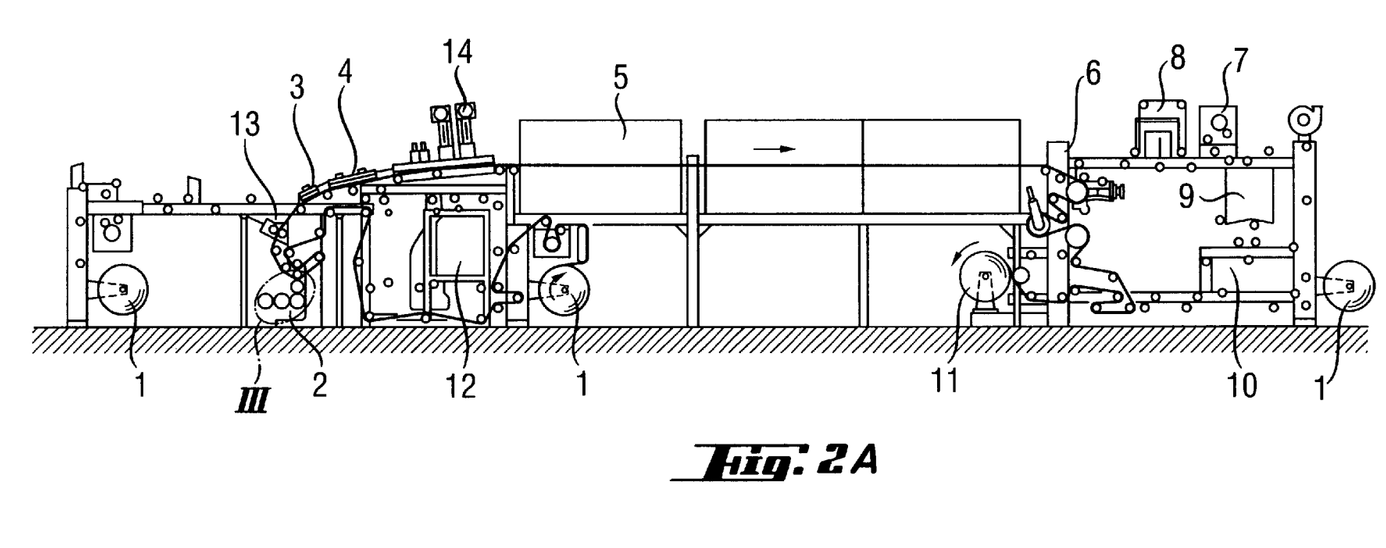
FIG. 2 shows the set-up of the coating plant.
Figure 2B:
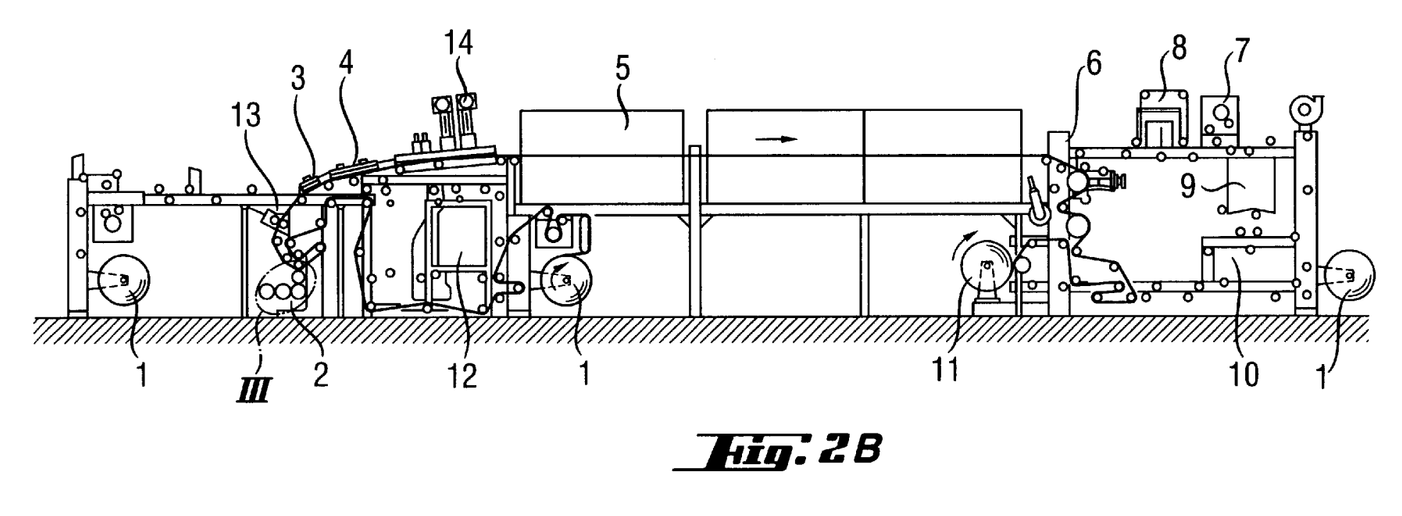
Figure 2C:
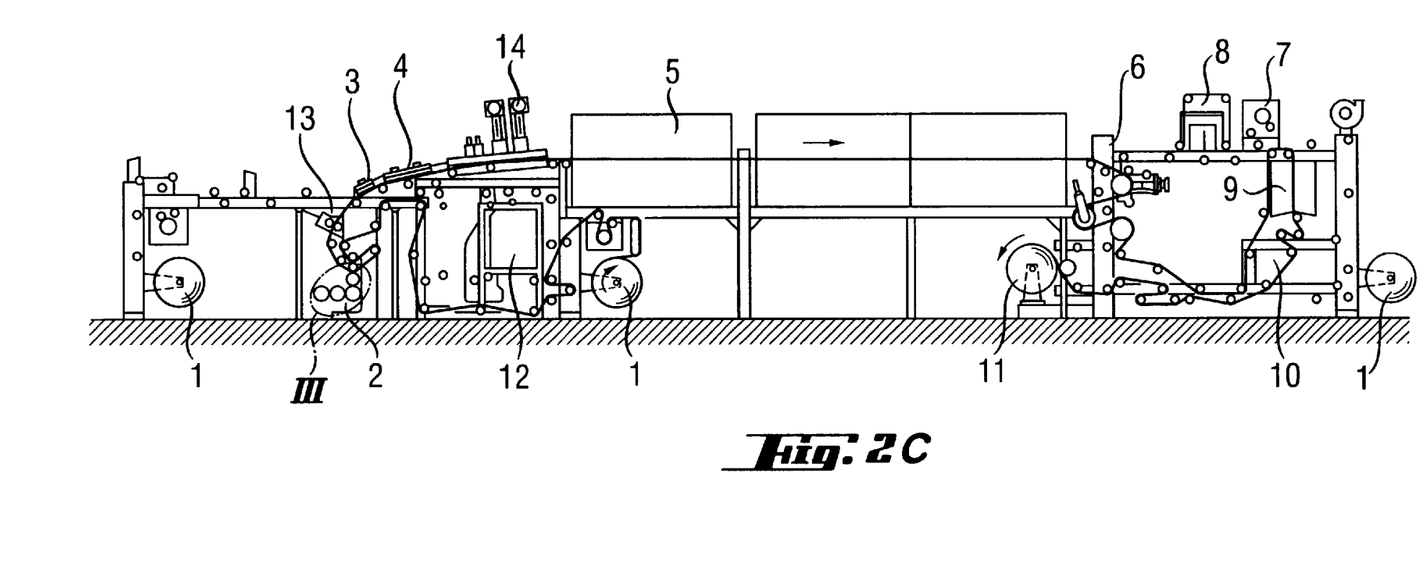
Figure 2D:
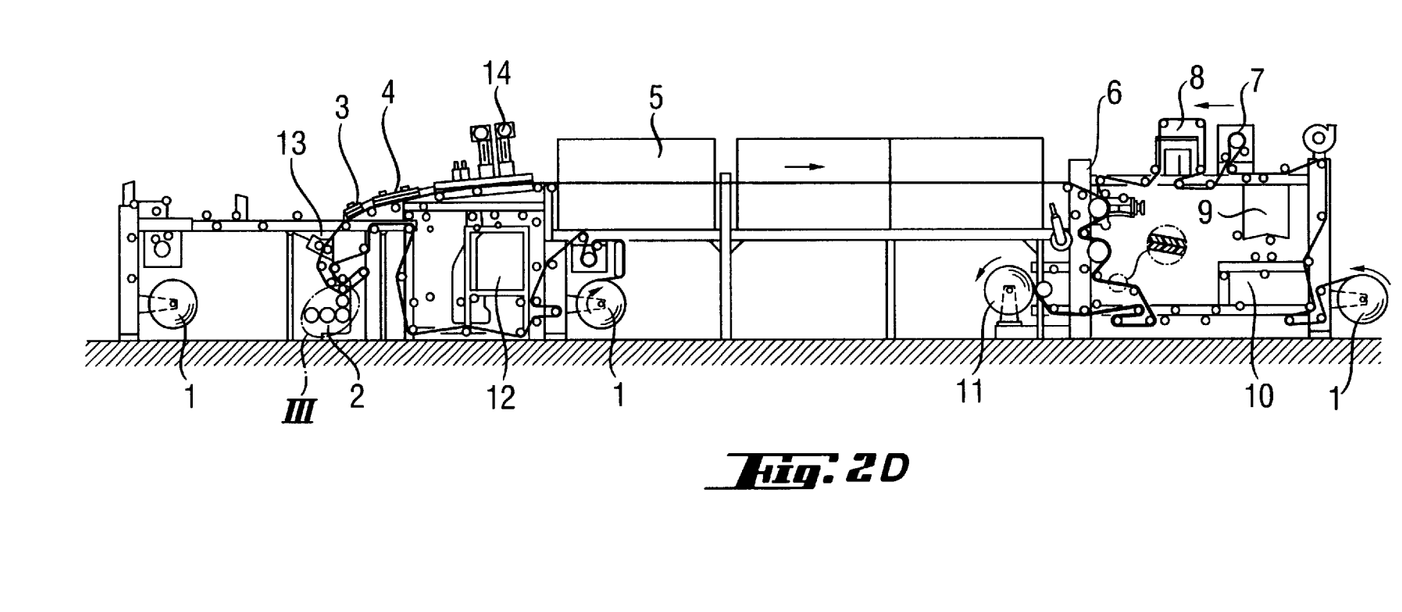
Figure 2E:
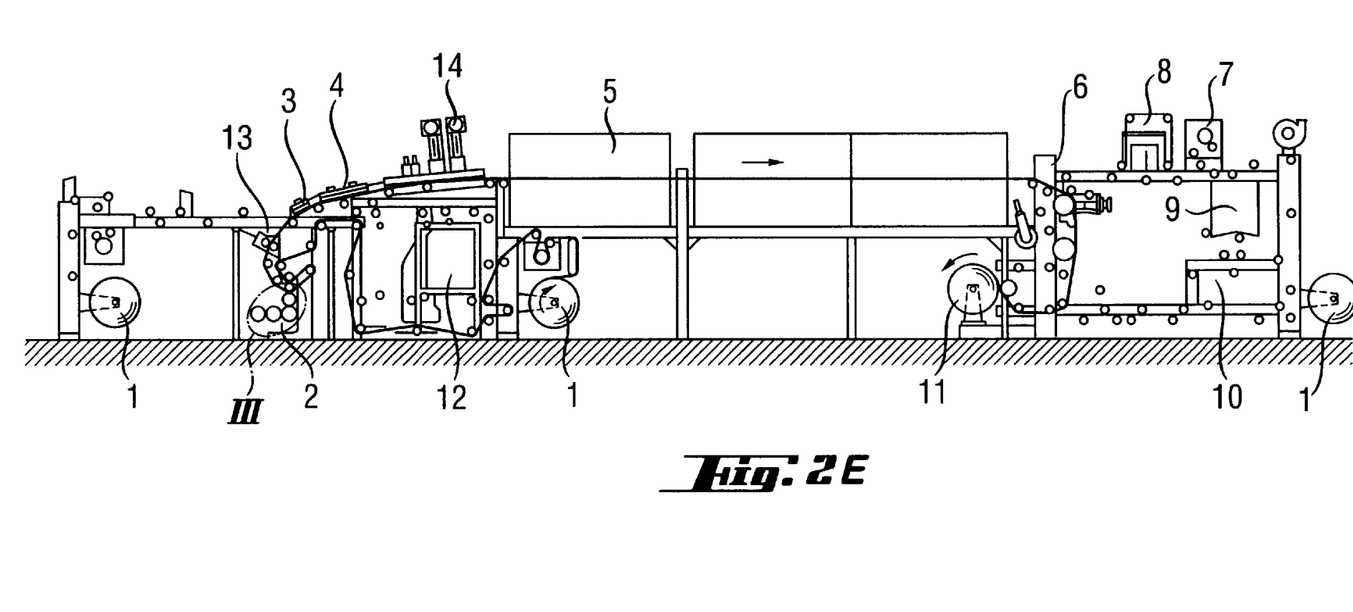

The coating plant of FIG. 1 comprises an unwind (1), application device (2), short-wavelength infrared source (3), medium-wavelength infrared source (4), flotation drier (5), dry-lamination unit (6), corona system (7), web edge-guiding system (8), remoistening equipment (9), cooling unit (10), wind up (11), electron-beam unit (12), wet-lamination unit (13) and UV source (14).

FIG. 2 shows the set-up of the coating plant for the following procedures:

A) thermal drying or UV curing
B) thermal drying with shock cooling
C) thermal drying with remoistening
D) thermal drying with dry lamination
E) thermal drying with UV curing.

Figure 3:
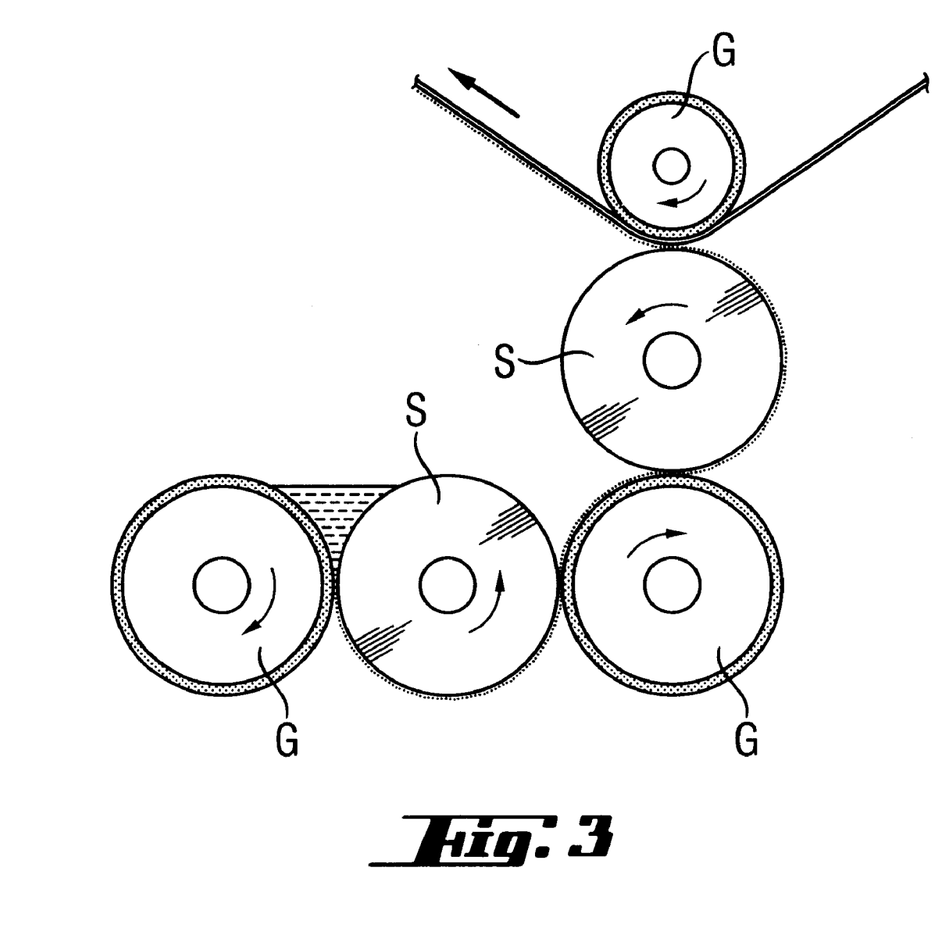
FIG. 3 shows the application device in the coating plant.

FIG. 3 shows the application device in the coating plant with application by smooth rollers using 4 rollers (wet). G here indicates a rubber roll and S a steel roll. The rolls here are heated and cooled. Application using smooth rolls is particularly suitable for the lamination of COC with PVC or oPP.

Figure 4:
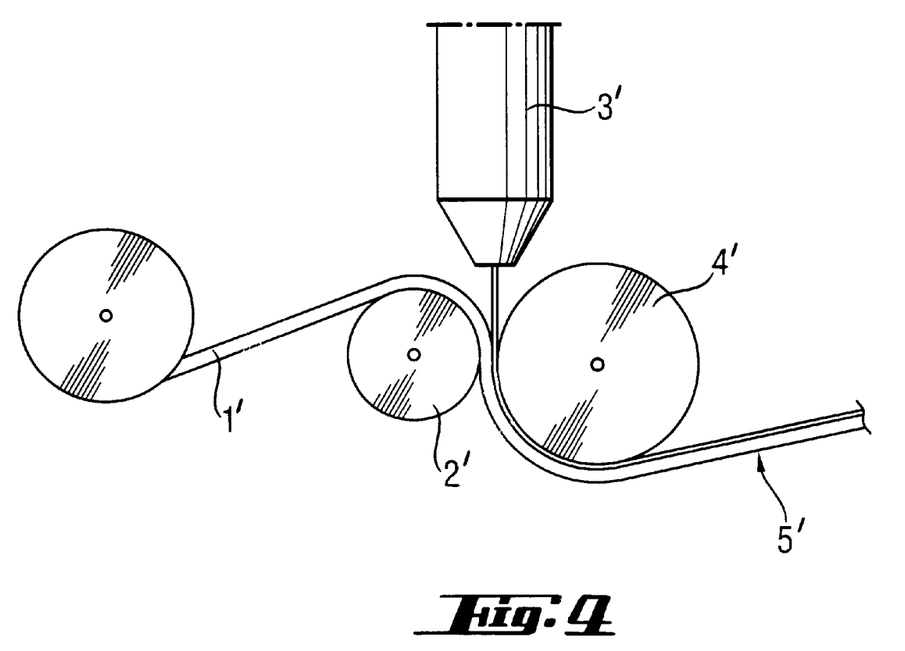
FIG. 4 shows the construction of an extrusion-coating plant for producing a 2-layer composite film.

The extrusion-coating plant of FIG. 4 comprises a backing film web (1'), an infeed roller (2'), a die (3'), a roll (4'), and the finished 2-layer composite film (5'). A web of paper or textile may replace the backing film web. The product shown is a two-layer composite. This process permits one side of the backing film web to be coated with a polymer melt in each pass through the machine. A second pass through the machine therefore permits coating of the side of the backing film which was not coated in the first step.

Figure 5:
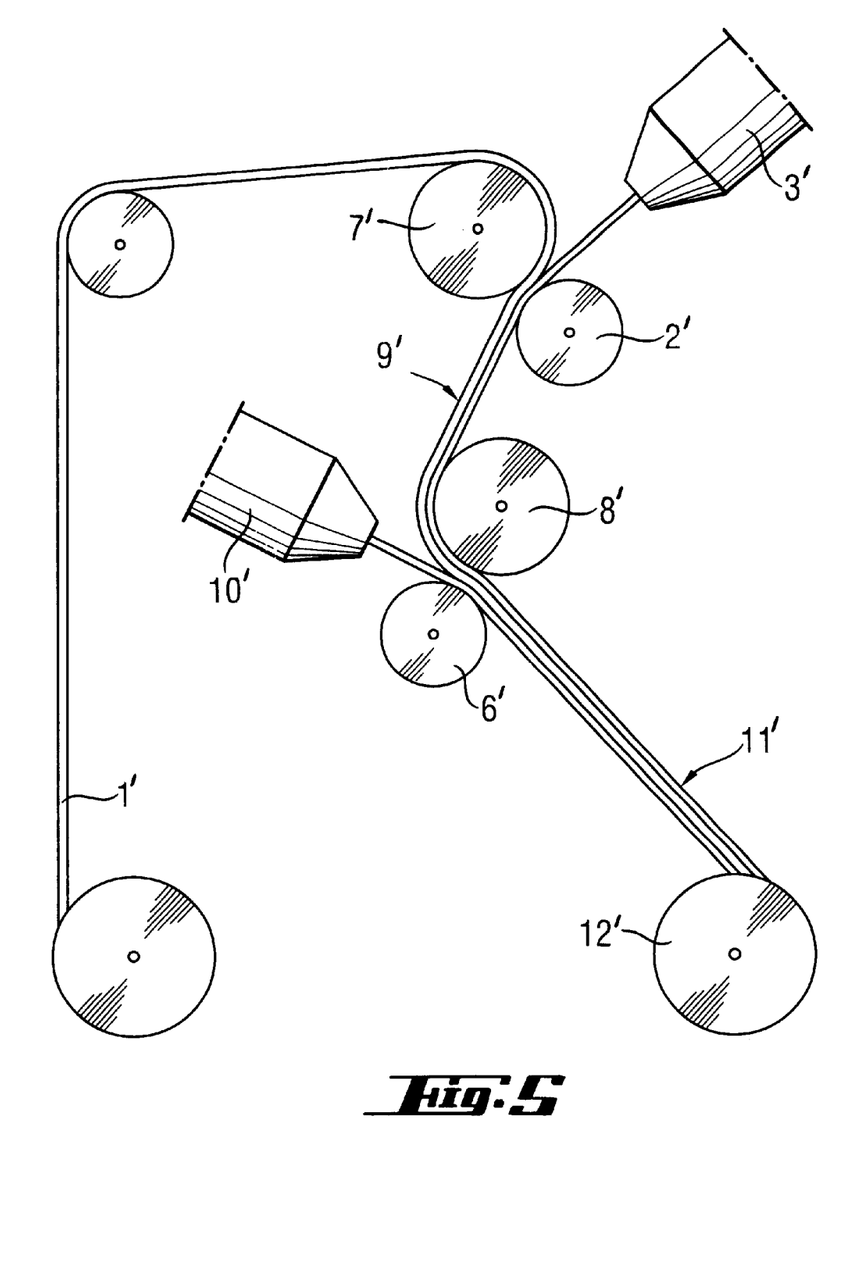
FIG. 5 shows the construction of an extrusion-coating plant for producing a 3-layer composite film.

The extrusion-coating plant of FIG. 5 comprises a backing film web (1'), a lay-on roller (2'), a die (3'), a deflecting roller (6'), a chill roller (7'), a roller (8'), a two-layer film web (9'), a die (10'), the finished 3-layer composite film (11') and a wind-up (12'). This process has two coating steps in sequence to apply the polymer melt to both sides of the backing film web, forming a 3-layer film in one pass through the machine.

EXAMPLES

The solvent-free single-component adhesive used, Herberts GmbH 1K-LF 190X3, has the following physical properties:

Solids (%) 100,
Viscosity (100° C.) 850=150 mPas

Example 1

A COC film 190 $\mu$m thick (194 g/m$^2$)was laminated to both sides of an unoriented polypropylene film 25 $\mu$m thick (22.5 g/m$^2$) using Herberts GmbH 1 K-LF 190X3 solvent-free single-component adhesive. Application was at 1.50 g/m$^2$, with corona treatment at 48 kW. For lamination a width of 810 mm was used, a speed of 50 m/min, and a smooth-roll application system with four rolls and one pass for each laminated side. The thickness of the thermoformable composite film was 210 $\mu$m. The bond strength of the composite film was high, and when this bond strength was measured it was the composite film which broke.

Example 2

A COC film 190 $\mu$m thick (194 g/m$^2$) was laminated to both sides of an unoriented PVC film 35 $\mu$m thick (4.6 g/m$^2$) using Herberts GmbH 1K-LF 190X3 solvent-free single-component adhesive. Application was at 1.50 g/m$^2$, with corona treatment at 48 kW. For lamination a width of 810 mm was used, a speed of 50 m/min, and a smooth-roll application system with four rolls and one pass for each laminated side. The thickness of the thermoformable composite film was 260 $\mu$m. The bond strength of the composite film was high, and when this bond strength was measured it was the composite film which broke.

Comparative Example 2

The procedure of the example was followed except that both sides of the COC film were laminated to an unoriented polypropylene film. The thickness of the thermoformable composite film was 210 $\mu$m.

Example 3

A COC film of thickness 190 $\mu$m (194 g/m$^2$) was, laminated on both sides with an oriented polypropylene film of thickness 5 $\mu$m (4.6 g/m$^2$) using Herberts GmbH 1 K-LF 190X3 solvent-free single-component adhesive. Application was at 1.50 g/m$^2$. Corona treatment at 48 kW. For lamination a width of 810 mm was used with a speed of 50 m/min, and a smooth-roller application system with four rollers and one pass for each laminated side. The thickness of the thermoformable composite film was 260 $\mu$m. The bond strength of the composite film was high, and when this strength was measured it was the composite film which fractured.

Comparative Example 3

The procedure of example 3 was followed except that both sides of the COC film were laminated with an unoriented polypropylene film. The thickness of the thermoformable composite film was 210 $\mu$m.

Example 4

300 m roll of a COC film (Topas® type 8007) of thickness 250 $\mu$m was firstly extrusion-coated on one side at a thickness of 12 $\mu$m (11 g/m$^2$) with LDPE (density 0.92 g/cm$^3$), using a die. This involved extrusion-coating the COC film with an application rate of 12 g/m$^2$ at a temperature of 310° C. and a speed of 90 m/min. The process was carried out as in FIG. 4. The single-side-extrusion-coated COC film was extrusion-coated on its uncoated side in a second pass through the machine using the application system used for the first pass and the same LDPE, at a speed of 80 m/min and a temperature of 320° C. The thickness of the extrusion-coated film was 274 μm.

Its high bond strength meant that measurements of the bond strength caused the LDPE film to tear. The bond strength between a film made from pure COC and LDPE is therefore high.

Comparative Example 4

The procedure of example 4 was followed except that each side of the COC film was extrusion-coated with polypropylene at a thickness of 12 μm. The thickness of the extrusion-coated film was 274 μm. The polypropylene film could be pulled away from the COC film without tearing. The bond strength between a film made from pure COC and polypropylene is therefore low.

While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described.

We claim:

1. A thermoformable composite film comprising a three layer thermoformable composite film comprising two films wherein each film comprises a metallocene system catalyzed cycloolefin copolymer ("COC") and one of said two films containing said COC is in direct contact with one side of a polyvinylchloride ("PVC")-containing thermoplastic film via laminative and the other of said two films containing said COC is in direct contact with the other side of said PVC-containing thermoplastic film via laminative.

2. A blister pack comprising the thermoformable composite film as claimed in claim 1.

3. The material as claimed in claim 1, wherein said metallocene catalyst system comprises a metallocene selected from the group consisting of:

rac-dimethylsilylbis(1-indenyl)zirconium dichloride,
rac-dimethylgermylbis(1-indenyl)zirconium dichloride,
rac-phenylmethylsilylbis(1-indenyl)zirconium dichloride,
rac-phenylvinylsilylbis(1-indenyl)zirconium dichloride,
1-silacyclobutylbis(1-indenyl)zirconium dichloride,
rac-diphenylsilylbis(1-indenyl)hafnium dichloride,
rac-phenylmethylsilylbis(1-indenyl)hafnium dichloride,
rac-diphenylsilylbis(1-indenyl)zirconium dichloride,
rac-ethylene-1,2-bis(1-indenyl)zirconium dichloride,
dimethylsilyl(9-fluorenyl)(cyclopentadienyl)zirconium dichloride,
diphenylsilyl(9-fluorenyl)(cyclopentadienyl)zirconium dichloride,
bis(1-indenyl)zirconium dichloride,
diphenylmethylene(9-fluorenyl) cyclopentadienylzirconium dichloride,
isopropylene(9-fluorenyl)cyclopentadienylzirconium dichloride,
rac-isopropylidenebis(1-indenyl)zirconium dichloride,
phenylmethylmethylene(9-fluorenyl) cyclopentadienylzirconium dichloride,
isopropylene(9-fluorenyl)(1-(3-isopropyl) cyclopentadienyl)zirconium dichloride,
isopropylene(9-fluorenyl)(1-(3-methyl)cyclopentadienyl) zirconium dichloride,
diphenylmethylene(9-fluorenyl)(1-(3-methyl) cyclopentadienyl)zirconium dichloride,
methylphenylmethylene(9-fluorenyl)(1-(3-methyl) cyclopentadienyl)-zirconium dichloride,
dimethylsilyl(9-fluorenyl)(1-(3-methyl) cyclopentadienyl)zirconium dichloride,
diphenylsilyl(9-fluorenyl)(1-(3-methyl)cyclopentadienyl) zirconium dichloride,
diphenylmethylene(9-fluorenyl)(1-(3-tert-butyl) cyclopentadienyl)zirconium dichloride,
isopropylene(9-fluorenyl)(1-(3-tert-butyl) cyclopentadienyl)zirconium dichloride,
isopropylene(cyclopentadienyl)(1-indenyl)zirconium dichloride,
diphenylcarbonyl(cyclopentadienyl)(1-indenyl) zirconium dichloride,
dimethylsilyl(cyclopentadienyl)(1-indenyl)zirconium dichloride,
isopropylene(methylcyclopentadienyl)(1-indenyl) zirconium dichloride,
4-($h^5$-cyclopentadienyl)-4,7,7-trimethyl($h^5$-4,5,6,7-tetrahydroindenyl)-zirconium dichloride,
[4-($h^5$-cyclopentadienyl)-4,7,7-triphenyl($h^5$-4,5,6,7-tetrahydroindenyl)]zirconium dichloride,
[4-($h^5$-cyclopentadienyl)-4,7-dimethyl-7-phenyl($h^5$-4,5,6,7-tetrahydroindenyl)]zirconium dichloride,
[4-($h^5$-3'-tert-butylcyclopentadienyl)-4,7,7-triphenyl($h^5$-4,5,6,7-tetrahydroindenyl)]zirconium dichloride,
[4-($h^5$-3'-tert-butylcyclopentadienyl)-4,7-dimethyl-7-phenyl($h^5$-4,5,6,7-tetrahydroindenyl)]zirconium dichloride,
[4-($h^5$-3'-methylcyclopentadienyl)-4,7,7-trimethyl($h^5$-4,5,6,7-tetrahydroindenyl)]zirconium dichloride,
[4-($h^5$-3'-methylcyclopentadienyl)-4,7,7-triphenyl($h^5$-4,5,6,7-tetrahydroindenyl)]zirconium dichloride,
[4-($h^5$-3'-methylcyclopentadienyl)-4,7-dimethyl-7-phenyl($h^5$-4,5,6,7-tetrahydroindenyl)]zirconium dichloride,
[4-($h^5$-3'-isopropylcyclopentadienyl)-4,7,7-trimethyl($h^5$-4,5,6,7-tetrahydroindenyl)]zirconium dichloride,
[4-($h^5$-3'-isopropylcyclopentadienyl)-4,7,7-triphenyl($h^5$-4,5,6,7-tetrahydroindenyl)]zirconium dichloride,
[4-($h^5$-3'-isopropylcyclopentadienyl)-4,7-dimethyl-7-phenyl($h^5$-4,5,6,7-tetrahydroindenyl)]zirconium dichloride,
[4-($h^5$-cyclopentadienyl)($h^5$-4,5-tetrahydropentalene)] zirconium dichloride,
[4-($h^5$-cyclopentadienyl)-4-methyl($h^5$-4,5-tetrahydropentalene)]zirconium dichloride,
[4-($h^5$-cyclopentadienyl)-4-phenyl($h^5$-4,5-tetrahydropentalene)]zirconium dichloride,
[4-($h^5$-3'-methylcyclopentadienyl)($h^5$-4,5-tetrahydropentalene)]zirconium dichloride,
[4-($h^5$-3'-isopropylcyclopentadienyl)($h^5$-4,5-tetrahydropentalene)]zirconium dichloride,
[4-($h^5$-3'-benzylcyclopentadienyl)($h^5$-4,5-tetrahydropentalene)]zirconium dichloride,
[2,2,4-trimethyl-4-($h^5$-cyclopentadienyl)($h^5$-4,5-tetrahydropentalene)]zirconium dichloride and
[2,2,4-trimethyl-4-($h^5$-(3,4-diisopropyl) cyclopentadienyl)($h^5$-4,5-tetrahydropentalene)] zirconium dichloride.

4. The film as claimed in claim 1, wherein said COC is norbornene-ethylene copolymer or tetracyclododecene-ethylene copolymer.

5. The film as claimed in claim 1, wherein said COC is norbornene-vinylnorbornene-ethylene terpolymer, norbornene-norbornadiene-ethylene terpolymer, tetracyclododecene-vinylnorbornene-ethylene terpolymer or tetracyclododecene-vinyltetracyclododecene-ethylene terpolymer.

6. The film as claimed in claim 1, wherein said COC is norbornene-ethylene copolymer or tetracyclododecene-ethylene copolymer.

7. The film as claimed in claim 1, wherein said coc is norbornene-vinylnorbornene-ethylene terpolymer, norbornene-norbornadiene-ethylene terpolymer, tetracyclododecene-vinylnorbornene-ethylene terpolymer or tetracyclododecene-vinyltetracyclododecene-ethylene terpolymer.

8. The thermoformable composite film as claimed in claim 1, wherein the thickness of the PVC film is from 5 to 150 $\mu$m and the thickness of the COC film is from 50 to 400 $\mu$m.

9. The thermoformable composite film as claimed in claim 8, where the thickness of the PVC film is from 10 to 100 $\mu$m and the thickness of the COC film is from 100 to 350 $\mu$m.

10. The thermoformable composite film as claimed in claim 9, where the thickness of the PVC film is from 20 to 50 $\mu$m and the thickness of the COC film is from 150 to 250 $\mu$m.

\* \* \* \* \*

UNITED STATES PATENT AND TRADEMARK OFFICE
CERTIFICATE OF CORRECTION

PATENT NO. : 6,641,925 B1
DATED : November 4, 2003
INVENTOR(S) : Ekkhard Beer et al.

It is certified that error appears in the above-identified patent and that said Letters Patent is hereby corrected as shown below:

<u>Column 12,</u>
Line 55, after "zirconium dichloride," insert -- [4-($h^5$-cyclopentadienyl)-4-phenyl ($h^5$-4,5-tetrahydropentalene)]zirconium dichloride, --.

Signed and Sealed this

Second Day of March, 2004

JON W. DUDAS
*Acting Director of the United States Patent and Trademark Office*